United States Patent [19]

Hoag et al.

[11] Patent Number: 5,270,422
[45] Date of Patent: Dec. 14, 1993

[54] CURING CATALYST COMPOSITIONS AND METHOD FOR PREPARING SAME

[75] Inventors: Carol A. Hoag; Michael A. Lutz; Steven W. Wilson, all of Midland, Mich.

[73] Assignee: Dow Corning Corporation, Midland, Mich.

[21] Appl. No.: 907,963

[22] Filed: Jul. 2, 1992

[51] Int. Cl.$^5$ .............................................. C08G 77/06
[52] U.S. Cl. ....................................... 528/15; 502/167
[58] Field of Search ......................... 528/15; 502/167

[56] References Cited

U.S. PATENT DOCUMENTS

| | | | |
|---|---|---|---|
| 3,445,420 | 5/1969 | Kookootsedes et al. | 528/31 |
| 4,584,631 | 4/1986 | Janik et al. | 528/15 |
| 4,791,186 | 12/1988 | Janik et al. | 528/15 |
| 5,064,916 | 11/1991 | Sasaki et al. | 528/20 |

FOREIGN PATENT DOCUMENTS 3-95267  4/1991  Japan.

*Primary Examiner*—Melvyn I. Marquis
*Attorney, Agent, or Firm*—Robert Spector

[57] ABSTRACT

Catalyst compositions suitable for use in one-part storage stable organosiloxane compositions that cure by a platinum-catalyzed hydrosilation reaction are prepared by blending a liquid complex of a platinum group metal compound and an ethylenically unsaturated organosiloxane compound with an alkylenediamine, and then combining the resultant mixture with an acetylenic alcohol. The catalyst compositions also contain at least one organohydrogensiloxane that is present prior to or during blending of said alkylene diamine with said acetylenic alcohol.

5 Claims, No Drawings

CURING CATALYST COMPOSITIONS AND METHOD FOR PREPARING SAME

BACKGROUND OF THE INVENTION

1. Field of the Invention

This invention relates to organosiloxane compositions that cure by a hydrosilation reaction catalyzed by a platinum group metal. More particularly, this invention relates to catalyst compositions useful for preparing one-part organosiloxane compositions that can be stored for extended periods of time yet cure at relatively low temperatures, and to a method for preparing these compositions.

2. Background Information

U.S. Pat. No. 4,584,631, which issued to G. Janik and P. Lo on Apr. 22, 1986 describes one-part storage stable organosiloxane compositions that cure by a platinum-catalyzed hydrosilation reaction. The compositions comprise a specified class of vinyl-containing polyorganosiloxanes consisting essentially of dimethylvinylsiloxane, dimethylsiloxane, trimethylsiloxy and methylsilsesquioxane units, an organohydrogensiloxane containing at least two silicon-bonded hydrogen atoms per molecule, a platinum-containing hydrosilation catalyst, and a member from a specified class of monoalkylamines and N,N,N',N'-tetraalkylalkylenediamines as the catalyst inhibitor.

U.S. Pat. No. 4,791,186, which issued to G. Janik and M. Buentello on Dec. 13, 1988 describes a method for increasing the storage stability of the curable compositions described in the aforementioned Janik and Lo patent by aging a mixture of the catalyst and catalyst inhibitor for at least 14 days under ambient conditions and then combining the resultant mixture with the vinyl-containing polyorganosiloxane.

Japanese laid-open patent application (Kokai) No. 3/95267 which was published on Apr. 19, 1991 describes storage-stable one part organosiloxane compositions comprising (A) a polyorganosiloxane wherein at least 0.05 percent of the silicon-bonded hydrocarbon radicals are alkenyl radicals, (B) an organosiloxane containing at least two siloxy units of the formula $HR_2SiO$ where R represents a substituted or unsubstituted monovalent hydrocarbon radical other than alkenyl, (C) a hydrosilation catalyst selected from metals in the platinum group of the periodic table and compounds of these metals, (D) from 2 to 20 moles per mole of the platinum group metal of a first platinum catalyst inhibitor selected from the same group as the inhibitors of the aforementioned Janik and Lo patent, and (E) at least 50 moles per mole of the platinum group metal of an acetylenic alcohol as the second platinum catalyst inhibitor. This patent publication teaches that the viscosity of a composition prepared by blending a mixture of all the ingredients (A–E) to homogeneity did not increase substantially over a six month period at room temperature.

SUMMARY OF THE INVENTION

It is often advantageous to have a catalyst master batch composition that is stable and can be mixed as required into a variety of organosiloxane compositions designed to meet specific product requirements. In attempting to prepare such a catalyst master batch, the present inventors discovered that blending the acetylenic alcohol and alkylene diamine catalyst inhibitors described in the aforementioned Japanese Patent Publication No. 3/95267 with a hydrosilation catalyst comprising a platinum compound that is complexed with an organosiloxane containing silicon-bonded vinyl or other alkenyl radicals in the absence of an organohydrogensiloxane results in formation of a black precipitate and at least partial inactivation of the platinum-containing catalyst. The effect of this catalyst inactivation is a decrease in the cure rate and extent of curing of curable compositions prepared using the catalyst composition.

One objective of this invention is to provide a hydrosilation catalyst composition that can be subsequently combined into a variety of storage stable, one part organosiloxane compositions that cure by a hydrosilation reaction at temperatures below about 150° C. and retain their initial cure properties during storage. The curable compositions are particularly useful as coating and encapsulating materials for temperature sensitive materials such as integrated circuits and other electronic devices.

A second objective is to provide a method for preparing storage-stable one part organosiloxane compositions containing a premixed inhibited curing catalyst composition that includes a complex of a platinum compound with an ethylenically unsaturated organosilicon compound.

The present inventors discovered that inhibited catalyst compositions suitable for use in one-part storage stable organosiloxane compositions that cure at relatively low temperatures by a platinum-catalyzed hydrosilylation reaction can be prepared by blending a liquid complex of a platinum group metal compound with an alkylenediamine, and then combining the resultant mixture with an acetylenic alcohol in the presence of an organohydrogensiloxane. Storage stable curable organosiloxane compositions are prepared by combining the present catalyst compositions with a polyorganosiloxane containing at least two vinyl or other alkenyl radicals per molecule and any additional organohydrogensiloxane not already present in the catalyst composition.

DETAILED DESCRIPTION OF THE INVENTION

This invention provides an inhibited catalyst composition for imparting storage stability to an organosiloxane composition curable by a platinum catalyzed hydrosilylation reaction, said catalyst composition comprising the product obtained by I. blending to homogeneity
   (A) a hydrosilation catalyst selected from the group consisting of complexes comprising a compound of a platinum group metal and an ethylenically unsaturated liquid organosiloxane compound and
   (B) to from 0.1 to 10 moles per mole of said platinum group metal of a first catalyst inhibitor consisting essentially of at least one amine of the formula $R^1{}_2NR^3NR^2{}_2$, and II. blending the resultant homogeneous mixture of A and B with
   (C) from 0.5 to 600 moles per mole of said platinum group metal of a second catalyst inhibitor consisting essentially of at least one acetylenic alcohol, with the proviso that said second catalyst inhibitor is combined with the hydrosilation catalyst either subsequent to or together with the addition of sufficient organohydrogensiloxane to react with substantially all of said organosiloxane compound and said acetylenic alcohol, where each $R^1$ and $R^2$ is individually selected from the group consisting of the hydrogen atom and alkyl radicals containing from 1 to 4 carbon atoms, $R^3$ is an alkylene radical, and the organic radicals bonded to the silicon atoms of said organosiloxane compound and said organohydrogensiloxane are monovalent substituted or unsubstituted hydrocarbon radicals.

Curable, storage stable organosiloxane compositions are prepared by blending a catalyst composition of this invention (D) additional organohydrogensiloxane as required to provide an amount sufficient to cure said organosiloxane composition and E) a polyorganosiloxane containing at least two alkenyl radicals per molecule, At least a portion of the organohydrogensiloxane identified as ingredient D is present in the catalyst compositions of this invention to retain catalyst activity. The organohydrogensiloxane is either combined with a mixture of the hydrosilation catalyst and alkylenediamine or is blended with the acetylenic alcohol before the alcohol is combined with the mixture of catalyst and alkylenediamine to form the present catalyst compositions.

THE HYDROSILATION CATALYST

The hydrosilation catalyst portion of the present catalyst compositions is a complex derived from a compound of a metal from the platinum group of the periodic table and an ethylenically unsaturated organosiloxane compound. The ethylenically unsaturated group is preferably a vinyl radical, and the platinum group metals include platinum, rhodium and palladium.

Hexachloroplatinic acid is a preferred compound based on its availability and the activity of this compound as a hydrosilation catalyst. The organosiloxane portion of the complex can be any liquid organosiloxane compound that will solubilize the platinum group metal compound and contains at least two vinyl or other ethylenically unsaturated hydrocarbon radicals per molecule.

Preferred complexes are described in U.S. Pat. No. 3,419,593 that issued to David N. Willing on Dec. 31, 1968. Complexes with low molecular weight organosiloxanes, such as disiloxanes, containing as the silicon bonded hydrocarbon radicals vinyl, methyl and optionally 3,3,3-trifluoropropyl are particularly preferred because of their ability to catalyze a rapid curing of organosiloxane compositions at temperatures as low as 70° C.

THE ALKYLENEDIAMINE INHIBITOR

One of the two classes of platinum catalyst inhibitors present in the catalyst compositions of this invention are alkylenediamines represented by the formula $R^1_2NR^3NR^2_2$ where $R^1$ and $R^2$ individually represent identical or different alkyl radicals or a hydrogen atom and $R^3$ represents an alkylene radical. In these formulae the alkyl radicals represented by $R^1$ and $R^2$ preferably contain from 1 to 4 carbon atoms, most preferably 1, and the alkylene radical represented by $R^3$ contains from 2 to 4 carbons and is most preferably ethylene.

Because alkylenediamines are relatively powerful catalyst inhibitors, the concentration of the diamine is typically equivalent to from 0.1 to about 10 moles, preferably from 0.5 to 1 mole, per mole of platinum or other platinum group metal in the catalyst composition.

THE ACETYLENIC ALCOHOL INHIBITOR

The acetylenic alcohol portion of the present catalyst compositions can be represented by the generic formula $R^4C\equiv C-R^5-CR^6R^7OH$, where $R^4$, $R^6$ and $R^7$ individually represent a hydrogen atom or a monovalent hydrocarbon radical and $R^5$ represents a single carbon-to-carbon bond or an alkylene radical, with the proviso that $R^4$, $R^5$, $R^6$ and $R^7$ are free of ethylenic or acetylenic unsaturation. In preferred embodiments of the acetylenic alcohol $R^4$ is hydrogen or phenyl, $R^5$ is a single bond and $R^6$ is methyl and $R^7$ is methyl or phenyl radical. Preferred acetylenic alcohol type inhibitors include but are not limited to 2-methyl-3-butyn-2-ol, 2-phenyl-3-butyn-2-ol and 1-ethynylcyclohexanol.

Because the acetylenic alcohol is typically a weaker inhibitor than the alkylenediamine, the concentration of alcohol is typically from 5 to about 600 moles per mole of platinum or other platinum group metal in the catalyst compositions. This concentration is preferably equivalent to from 10 to 100 moles per mole of platinum.

THE ORGANOHYDROGENSILOXANE

The present catalyst compositions include an organohydrogensiloxane that contains at least two silicon-bonded hydrogen atoms per molecule.

The present inventors discovered that when the acetylenic alcohol is added to a mixture of the hydrosilation catalyst and alkylenediamine inhibitor in the absence of the organohydrogensiloxane, the mixture turns black and the activity of the catalyst in the final organosiloxane composition is substantially reduced. The black color is believed due to the formation of free platinum metal. The discoloration of the composition is considerably reduced when the acetylenic alcohol or the mixture of platinum-containing catalyst and alkylene diamine is diluted with the organohydrogensiloxane prior to blending of the acetylenic alcohol with the catalyst.

The final curable organosiloxane composition can contain two or more organohydrogensiloxanes with different numbers of silicon-bonded hydrogen atoms per molecule. The type(s) of organohydrogensiloxane(s) selected will depend, at least in part, on the physical properties desired in the cured elastomer.

Preferred compositions contain an organohydrogensiloxane with two silicon-bonded hydrogen atoms per molecule, referred to as a chain extender. These compositions also include a crosslinker in the form of a polyorganosiloxane containing at least three silicon-bonded hydrogen atoms or at least three silicon bonded alkenyl radicals per molecule.

The organic groups bonded to the silicon atoms of the organohydrogensiloxane and the alkenyl-substituted polyorganosiloxanes are monovalent hydrocarbon radicals that are free of ethylenic unsaturation. These hydrocarbon radicals can be unsubstituted or can contain one or more substituents that will not interfere with curing of the present compositions. Suitable substituents include but are not limited to halogen atoms such as chlorine, bromine and fluorine.

Preferred hydrocarbon radicals include alkyl radicals containing from one to about four carbon atoms, haloalkyl radicals such as chloromethyl and 3,3,3-trifluoropropyl and aromatic radicals such as phenyl and tolyl.

Most preferably at least 50 percent of hydrocarbon radicals present on the organohydrogensiloxane(s) and the alkenyl-substituted polyorganosiloxane(s) used to prepare the curable organosiloxane compositions of the present invention are methyl, and any remainder are phenyl and/or 3,3,3-trifluoropropyl, this preference being based on the availability of the reactants typically used to prepare the polyorganosiloxanes and the properties of cured elastomers prepared from these polydiorganosiloxanes.

PREPARATION OF CATALYST COMPOSITIONS

The present catalyst compositions are prepared by first blending the hydrosilation catalyst with an alkylenediamine such as N,N,N',N'-tetramethylethylenediamine, referred to in this specification as the first platinum catalyst inhibitor. The resultant mixture is then blended with the acetylenic alcohol, referred to in this specification as the second platinum catalyst inhibitor, in the presence of at least a portion of the organohydrogensiloxane required to prepare a curable organosiloxane composition. The organohydrogensiloxane can be added together with or preceding blending of the acetylenic alcohol with the mixture of hydrosilation catalyst and alkylenediamine type catalyst inhibitor.

If the acetylenic alcohol is a solid under ambient conditions, such as 2-phenyl-3-butyn-2-ol, it may be necessary to heat the mixture of the alcohol and at least a portion of the organohydrogensiloxane to solubilize the alcohol.

THE ALKENYL-SUBSTITUTED POLYORGANOSILOXANE

The curable organosiloxane compositions of this invention comprise the present catalyst composition, at least one organohydrogensiloxane and at least one liquid polyorganosiloxane containing two or more alkenyl radicals per molecule. These polyorganosiloxanes are liquid or pumpable materials exhibiting viscosities of from 0.1 to about 1000 Pa.s at 25° C. The alkenyl radicals typically contain from 2 to about 20 carbon atoms, and include but are not limited to vinyl, allyl, and 5-hexenyl. Vinyl and 5-hexenyl are preferred, based on the cost of the corresponding intermediates and the reactivity of the polyorganosiloxanes containing these radicals.

Other silicon-bonded organic radicals that can be present on the organopolysiloxane in addition to the alkenyl radicals are described in the preceding section of this specification relating to the organohydrogensiloxane ingredient.

Representative embodiments of preferred alkenyl-substituted polyorganosiloxanes containing vinyl radicals only at the terminal positions include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

Copolymers containing dimethylsiloxane, dimethylvinylsiloxane, methylsilsesquioxane and trimethylsiloxy units are also particularly suitable as the alkenyl-substituted polyorganosiloxane ingredient.

The present curable compositions can contain a single alkenyl-substituted polyorganosiloxane. Alternatively two or more of these polyorganosiloxanes can be present. The polyorganosiloxanes differ with respect to their molecular weight and/or the number of silicon-bonded alkenyl radicals per molecule.

The relative concentrations of alkenyl-substituted polyorganosiloxane(s) and organohydrogensiloxane(s) is adjusted to achieve a molar ratio of silicon bonded hydrogen atoms to alkenyl radicals that is typically from 0.5 to about 1.0. The preferred ratio will be dependent upon the molecular weight and molecular configuration of the polyorganosiloxane(s) and organohydrogensiloxane(s) present in the curable composition.

Optional Ingredients

In addition to the hydrosilation catalyst, catalyst inhibitors, organohydrogensiloxane(s), and alkenyl-substituted polyorganosiloxane(s), the curable organosiloxane compositions of this invention can contain additional ingredients that impart or enhance certain properties to the cured gel or elastomer or facilitate processing of the curable composition.

Typical additives include but are not limited to reinforcing and non-reinforcing fillers, pigments, dyes, adhesion promoters, flame retardants, heat and/or ultraviolet light stabilizers and resinous organosiloxane copolymers to enhance the physical properties of the cured organosiloxane material.

Finely divided forms of silica are commonly used as reinforcing fillers in organosiloxane compositions. To prevent a premature hardening of the composition, referred to as "creping", the reinforcing fillers are typically treated with low molecular weight organosilicon compounds that either contain silanol groups or are readily hydrolyzed to a form that will react with the silanol groups present on the filler.

PREPARATION OF CURABLE ORGANOSILOXANE COMPOSITIONS

Curable organosiloxane compositions containing the present inhibited catalyst compositions are prepared by combining the catalyst composition with the alkenyl-substituted polyorganosiloxane(s), the organohydrogensiloxane(s) not added during preparation of the catalyst composition and any additional optional ingredients discussed in the preceding section of this specification.

When used in curable organosiloxane compositions the hydrosilation catalyst can be present in an amount equivalent to as little as one part by weight of platinum or other platinum group metal per one million parts of the curable composition that comprises an inhibited catalyst composition of this invention, an organohydrogensiloxane and a polyorganosiloxane containing at least two alkenyl radicals per molecule.

Catalyst concentrations equivalent to from 5 to 50 parts by weight of platinum per million parts of curable composition are preferred to achieve a practical curing rate. Higher concentrations of platinum provide only marginal improvements in curing rate, and are therefore economically unattractive, particularly when the preferred catalysts are used.

The present inventors discovered that the clarity of some curable organosiloxane compositions can be improved if a first mixture of the hydrosilation catalyst and the alkylenediamine inhibitor and a second mixture containing the acetylenic alcohols and organohydrogensiloxane(s) are separately combined with the alkenyl-substituted polyorganosiloxane.

Any equipment conventionally used to prepare liquid or pumpable organosiloxane compositions can be used to prepare the present curable compositions.

Liquid or pumpable organosiloxane compositions containing liquid polyorganosiloxanes that cure by a platinum-catalyzed hydrosilation reaction are well known, and are described, for example, in U.S. Pat. No. 4,785,047, which issued to Jensen on Nov. 15, 1988.

Curable organosiloxane compositions containing the present catalyst compositions are not only storage stable for extended periods of time under ambient conditions, but also retain their initial cure characteristics during storage. These characteristics include the time required for initiation and completion of curing at a given temperature and the hardness of the final cured material.

EXAMPLES

The following examples describe preferred embodiments of the present catalyst compositions and curable organosiloxane compositions prepared using these catalyst compositions. The examples should not be interpreted as limiting the scope of the invention defined in the accompanying claims. All parts and percentages in the examples are by weight and viscosity values were measured at 25° C.

EXAMPLE 1

This comparative example demonstrates the discoloration and loss of catalytic activity that occurs when an acetylenic alcohol and an alkylenediamine are blended with a platinum-containing hydrosilation catalyst without prior addition of an organohydrogensiloxane.

A mixture prepared by blending 0.001395 part of N,N,N',N'-tetramethylethylenediamine (TMEDA) and 0.15 part of methylbutynol was combined with 0.7 part of a complex of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent. The resultant black mixture was blended with 2.625 parts of a dimethylhydrogensiloxy-terminated polydimethylsiloxane containing an average of 10 dimethylsiloxane units per molecule, referred to hereinafter as (1), and 4.375 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent, referred to hereinafter as (2).

The catalyst composition was blended with 492 parts of a dimethylvinylsiloxy-terminated polydimethylsiloxane having a viscosity of about 0.4 Pa.s at 25° C. and the resultant curable organosiloxane composition was placed in a container and heated for one hour at 100° C. Only the surface of the composition was cured, indicated that a portion of the platinum catalyst had been inactivated.

The same black precipitate and loss of catalyst activity was observed when the TMEDA was blended with the platinum catalyst followed by blending of the resultant mixture with the methylbutynol.

EXAMPLE 2

This example demonstrates the effect on the curability of an organosiloxane composition resulting from adding an acetylenic alcohol inhibitor prior to addition of a diamine type of catalyst inhibitor.

The following types and amounts of ingredients were used to prepare curable organosiloxane compositions:

as ingredient I, 98.4 parts of a dimethylvinylsiloxy-terminated polydimethylsiloxane having a viscosity of about 0.4 Pa.s at 25° C.

as ingredient IIA, 0.525 part of the organohydrogensiloxane identified as 1 in Example 1;

as ingredient IIB, 0.875 part of the organohydrogensiloxane identified as 2 in Example 1 as ingredient III, 0.14 part of the platinum catalyst described in Example 1 as ingredient IV, 0.03 parts of 2-methyl-3-butyn-2-ol as the acetylenic alcohol, equivalent to 79.25 moles of 2-methyl-3-butyn-2-ol per mole of platinum, and as ingredient V, 0.00028 parts of N,N,N',N'-tetramethylethylenediamine (TMEDA), equivalent to 0.53 mole of TMEDA per mole of platinum.

Curable compositions 1-4 were prepared by adding the ingredients in the order listed below. The intermediate mixture was blended by placing it in a cylindrical container and rolling the container for 15 minutes under ambient conditions following addition of each ingredient. The final mixture was blended in the same manner for the same length of time.

1—A mixture of III and V, followed by a mixture of IIA, IIB and IV, followed by I.

2—A mixture of III and IV, followed by a mixture of IIA, IIB and V, followed by I (a comparative example outside of the present invention)

3—A mixture of III, V and IIA, followed by a mixture of IV and IIB, followed by I, and 4—A mixture of III and V, followed by a mixture of IV and IIB, followed by I.

Each composition (1-4) was stored under ambient conditions for 41 days. 100 parts of each initial composition was cured by heating it at 135° C. and observing the time, in minutes, required for the composition to form a gel, up to maximum of 120 minutes.

The penetration value of each gel was measured using a penetrometer manufactured by Precision Scientific, Chicago, Ill. The penetrometer was equipped with an aluminum shaft and a cylindrical tip measuring 0.32 cm. in diameter. The combined weight of the shaft and tip was 14.5 g. The samples were cured by heating them for 30 minutes at a temperature of 150° C. prior to determination of the penetration value.

The viscosity of each initial composition was also measured. Cure times and viscosity values were also determined for each of the compositions following 17 and 41 days of storage at 25° C. The data from the measurements are recorded in Table 1.

TABLE 1

| | Cure Time / Penetration (mm)$^2$ (Min)$^1$ Days of Storage | | | Shelf Life Viscosity (Pa · s) Days of Storage | | |
|---|---|---|---|---|---|---|
| | 0 | 17 | 41 | 0 | 17 | 41 |
| 1 | 18.9/37.4 | 17.6/34.8 | N.D./34.0 | 502 | 500 | 492 |
| 2$^3$ | >45/183.2 | >120/liquid | >120/167.8 | 500 | 500 | 489 |
| 3 | 18.9/37.8 | 18.4/35.2 | 13.4/32.0 | 500 | 500 | 534 |
| 4 | 15.9/4.0 | 14.3/3.2 | 13.5/2.6 | 486 | 500 | 505 |

$^1$Samples cured at 135° C.
$^2$Penetration values measured on samples cured for 30 minutes at 150° C.
$^3$Comparison Example - acetylenic alcohol added prior to the tetramethylethylenediamine. Black precipitate formed. All other samples (1, 3 and 4) remained clear and light yellow in color.
N.D. = Not determined

EXAMPLE 3

This example demonstrates the effect on storage stability of the concentration levels of acetylenic alcohol and a chain extender type of organohydrogensiloxane.

Catalyst compositions of this invention were prepared by sequentially combining the following ingredients in the order given:

0.1 part of the platinum-containing hydrosilylation catalyst described in example 1;

0.0003 part of N,N,N',N'-tetramethylethylenediamine (TMEDA) as a chain extender, equivalent to 0.7 mole of TMEDA per mole of platinum;

0.05 or 1 part of a dimethylhydrogensiloxy-terminated polydimethylsiloxane containing an average of 20 dimethylsiloxane units per molecule;

as the crosslinking reactant, 0.94 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent;

0.05 or 0.1 part of 2-phenyl-3-butyn-2-ol (PB) as the acetylenic alcohol, equivalent to 19.7 and 39.4 moles of PB per mole of platinum;

Curable organosiloxane compositions were prepared by blending the resultant catalyst compositions to homogeneity and combining them with sufficient liquid dimethylvinylsiloxy-terminated polydimethylsiloxane to prepare 100 parts by weight of curable composition. The polydimethylsiloxane exhibited a viscosity of 0.4 Pa.s A portion of each curable composition was placed in a container to form a 150 mm-thick layer and heated for 30 minutes at 120° C. All of the compositions were completely cured at the end of this period.

A second portion of each curable composition was heated at 50° C. to simulate accelerated aging under ambient conditions. The viscosities of the compositions were measured periodically and the results are recorded in the following Table 2. The viscosity of the initial composition was 0.45 Pa.s

TABLE 2

| Sample | PB | Chain Extender | Viscosity (Pa · s) @ 50° C. |
|---|---|---|---|
| 1 | 0.01 | 0.05 | Cured between 2 & 3 days* |
| 2 | 0.02 | 0.05 | 0.44 @ 2 and 4 days;* 10.0 @ 6 days |
| 3 | 0.01 | 0.1 | Cured after 4 days |
| 4 | 0.02 | 0.1 | 0.44 @ 4 days;4 @ 6 days |

*A light yellow precipitate was present prior to addition of the vinyl-containing polydimethylsiloxane, remained behind when catalyst was combined with vinyl-substituted polydimethylsiloxane.

The results in Table 2 demonstrate the increase in long-term storage stability with increasing concentration of the chain extender type of organohydrogenpolysiloxane containing two silicon-bonded hydrogen atoms per molecule.

EXAMPLE 4

This example demonstrates the effect on storage stability of a curable composition of using symtetramethyldisiloxane as the chain extending organohydrogensiloxane in combination with vinyl- and hexenyl-functional polydimethylsiloxanes.

A catalyst composition was prepared using the procedure described in the preceding example 4, with the exception that the chain extending organohydrogensiloxane was sym-tetramethyldisiloxane. The vinyl-containing polydimethylsiloxane (IA) used to prepare the curable composition was the same one used in the preceding examples and the hexenyl-functional polymer (IB) was a dimethyl-5-hexenylsiloxy-terminated polydimethylsiloxane exhibiting a viscosity of 450 Pa.s The amount of phenylbutynol in all of the compositions was 0.02 part, equivalent to 46.7 mole per mole of platinum, the amount of platinum catalyst was 0.1 part, the amount of TMEDA was 0.0003 part, equivalent to 0.83 mole per mole of platinum, the amount of crosslinking reactant was 0.95 part and the amount of sym-tetramethyl-disiloxane was 0.01 or 0.02 part. All of the compositions cured to acceptable products when heated for 30 minutes at 115° C. The results of the accelerated storage stability test conducted as described in the preceding examples are recorded in Table 3. The initial viscosity of the composition was 0.4 Pa.s.

TABLE 3

| Sample | Chain Extender (Parts) | Vinyl or Hexenyl | Viscosity (Pa · s @ 50° C.) |
|---|---|---|---|
| 1 | 0.01 | Vinyl | 0.780 @ 1 Day Cured @ 2 Days |
| 2 | 0.02 | Vinyl | 0.780 @ 1 Day Cured @ 2 Days |
| 3 | 0.01 | Hexenyl | 1.14 @ 1 Day Cured @ 2 Days[1] |
| 4 | 0.02 | Hexenyl | 1.16 @ 1 Day Cured @ 2 Days[1] |

1 = viscous liquid

The data in Table 3 demonstrate the higher reactivity of the hexenyl-functional polydimethylsiloxane.

EXAMPLE 5

This example describes a preferred method for preparing curable organosiloxane compositions containing the present catalyst compositions.

Catalyst compositions of this invention were prepared by sequentially combining the following ingredients in the order given:

0.08 part of the platinum-containing hydrosilylation catalyst (1) described in example 1;

3.92 part of (TMEDA) (2) equivalent to 4.9 mole of TMEDA per mole of platinum;

as the chain extender (3), 2 or 4 parts of a dimethylhydrogensiloxy-terminated polydimethylsiloxane containing an average of 20 dimethylsiloxane units per molecule;

as the crosslinking reactant (4), 40 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent;

0.4 or 0.8 part of 2-phenyl-3- butyn-2-ol (5) as the acetylenic alcohol, equivalent to 19.9 and 39.8 moles of PB per mole of platinum;

Catalyst compositions of this invention were prepared by blending (1) with (2), adding (3) to this mixture, mixing, adding (4), mixing, and then adding (5), followed by mixing for about 16 hours. The two samples containing 2 parts of (3), exhibited a small amount of gas evolution and precipitation of a small amount of rubbery material following addition of (3) and the final composition was light yellow. The two samples containing 4 parts of (3) were light brown without any evidence of gas evolution or precipitation.

When blended with 98.9 parts of the dimethylvinylsiloxy-terminated polydimethylsiloxane of Example 5 samples 1 and 3 cured following 3 or 4 days at a temperature of 50 °C., which simulated accelerated aging under ambient conditions. Samples 2 and 4 were cured after 6 days at this temperature. All of the curable compositions were cloudy and produced cloudy cured materials.

Clear curable compositions and cured products could be prepared by adding a mixture of (1) and (2) followed by a mixture of (3), (4) and (5) to the dimethylvinylsiloxy-terminated polydimethylsiloxane. There was no substantial difference between the curing time and storage stability of curable organosiloxane compositions prepared in this manner and those prepared by adding all of the ingredients of the present catalyst compositions as a single mixture to the vinyl-terminated polydimethylsiloxane.

That which is claimed is:

1. A catalyst composition for imparting long term storage stability to an organosiloxane composition curable by a platinum catalyzed hydrosilation reaction, said catalyst composition comprising the product obtained by
   I. blending to homogeneity
      (A) a hydrosilation catalyst derived from a complex comprising a compound of a platinum group metal and an ethylenically unsaturated liquid organosiloxane compound and
      (B) from 0.1 to 10 moles per mole of said platinum group metal, of a first catalyst inhibitor of the formula $R^1_2NR^3NR^2_2$, and
   II. blending the resultant homogeneous mixture of A and B with
      (C) from 0.5 to 600 moles per mole of said platinum group metal of a second catalyst inhibitor consisting essentially of at least one acetylenic alcohol, with the proviso that said second catalyst inhibitor is combined with the hydrosilation catalyst either subsequent to or along with addition of sufficient organohydrogensiloxane to react with substantially all of said organosiloxane compound and said acetylenic alcohol, where each $R^1$ and $R^2$ is individually selected from the group consisting of the hydrogen atom and alkyl radicals containing from 1 to 4 carbon atoms, $R^3$ is an alkylene radical, and the organic radicals bonded to the silicon atoms of said organosiloxane compound and said organohydrogensiloxane are monovalent substituted or unsubstituted hydrocarbon radicals.

2. A composition according to claim 1 where the amount of said first inhibitor is from 0.5 to 1 mole per mole of said platinum group metal; the amount of said second inhibitor is from 10 to 100 moles per mole of said platinum group metal; said hydrosilation catalyst is a complex of chloroplatinic acid and an organosiloxane containing at least two vinyl radicals per molecule; $R^1$ and $R^2$ are alkyl radicals containing from 1 to 4 carbon atoms, $R^3$ contains from 2 to 4 carbon atoms, the acetylenic alcohol has the formula $R^4{\equiv}CR^5CR^6R^7OH$, where $R^6$ and $R^7$ represent hydrogen or a monovalent hydrocarbon radical free of unsaturation, and $R^5$ represents a single bond or an alkylene radical.

3. A composition according to claim 1 where the organic groups on said organohydrogensiloxane are selected from the group consisting of alkyl radicals containing from 1 to 4 carbon atoms, phenyl and 3,3,3-trifluoropropyl radicals.

4. A composition according to claim 3 where said organohydrogensiloxane is sym-tetramethyldisiloxane or a diorganohydrogensiloxy-terminated polydiorganosiloxane.

5. A composition according to claim 2 where $R^1$, $R^2$ and $R^6$ are methyl, $R^3$ is ethylene, and $R^4$ is phenyl or hydrogen, $R^5$ is a single bond; and said organic groups are methyl.

* * * * *